(12) United States Patent
Kobayashi et al.

(10) Patent No.: US 6,645,559 B2
(45) Date of Patent: Nov. 11, 2003

(54) METHOD FOR TRIMMING RESIN FILM

(75) Inventors: Akira Kobayashi, Kanagawa-ken (JP); Kouji Yamada, Kanagawa-ken (JP); Yuji Funagi, Kanagawa-ken (JP); Narimasa Maida, Yamaguchi-ken (JP); Hiroshi Inazawa, Yamaguchi-ken (JP); Takuji Nakamura, Yamaguchi-ken (JP); Noriaki Kaguma, Yamaguchi-ken (JP)

(73) Assignees: Toyo Kohan Co., Ltd., Tokyo (JP); Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 10/058,235

(22) Filed: Jan. 29, 2002

(65) Prior Publication Data

US 2003/0143336 A1 Jul. 31, 2003

(51) Int. Cl.[7] .................................................. B05D 3/12
(52) U.S. Cl. ....................................... 427/365; 427/359
(58) Field of Search ................................ 427/209, 210, 427/277, 278, 359, 365

(56) References Cited

U.S. PATENT DOCUMENTS 5,407,702 A * 4/1995 Smith et al. ................. 427/211

FOREIGN PATENT DOCUMENTS

| JP | 61-127331 | * | 6/1986 |
| JP | 06-064061 | * | 3/1994 |
| JP | 06-064093 |   | 3/1994 |
| JP | 06-064127 |   | 3/1994 |
| JP | 06-155618 |   | 6/1994 |
| JP | 10-016132 |   | 1/1998 |
| JP | 2000-037763 | * | 2/2000 |

* cited by examiner

Primary Examiner—Katherine A. Bareford
(74) Attorney, Agent, or Firm—Browdy and Neimark PLLC

(57) ABSTRACT

The present invention provides a method for trimming a resin film which can recycle lug portions of the resin film after trimming, can easily trim the resin film even when the resin film is made of resin which becomes fragile by cooling, and enhance the use efficiency of a laminated sheet by making resin coated portions disposed at both sides of the laminated sheet thin. At the time of coating molten resin at least on one surface of a substrate to form a resin film after making the molten resin pass between coating rolls, the lug portions of the resin film are trimmed before the lug portions of the resin film are cooled.

7 Claims, 14 Drawing Sheets

METHOD FOR TRIMMING RESIN FILM

BACKGROUND OF THE INVENTION

1. Field of the Invention

The present invention relates to a method for trimming a resin film in which lugs which are generated at the time of forming the resin film by extruding and laminating resin to a surface of a substrate using a T-die.

2. Description of the Related Art

Conventionally, for example, at the time of manufacturing a laminated sheet which forms a resin film on a surface of a metal sheet, to dispose both end portions of the resin film which are made thick due to a neck-in phenomenon, following methods have been adopted. In one method, both end portions of the resin film are formed as lug portions at both sides of the laminated sheet and thereafter they have been trimmed together with a necessary minimum amount of the metal sheet. In the other method, the width of the metal substrate is sufficiently widened to prevent the generation of lug portions, the resin film is laminated to the metals sheet and thereafter both end portions of the resin film are trimmed together with the substrate of a corresponding quantity of width.

However, in the former method, there has been a problem that the fall of the lug portion or the entanglement or the adhesion of the lug portion to the substrate occurs along a path leading to a trimming step, while in the latter method, the portion of the laminated plate where the resin film is thick cannot be used and hence, there has been a problem that the use efficiency of the metal sheet is worsened. Further, in both methods, the trimmed resin film is integrally formed with the metal sheet and hence, there has been a problem that the trimmed resin film cannot be recycled.

Accordingly, the present invention has been made in view of such problems and it is an object of the present invention to provide a method for trimming a resin film which can recycle lug portions of a resin film after trimming, can easily trim the resin film even when the resin film is made of resin which becomes fragile when cooled, and can enhance the use efficiency of a laminated sheet by making resin coated portions disposed at both sides of the laminated sheet thin.

SUMMARY OF THE INVENTION

A method for trimming a resin film according to the present invention is characterized in that, at the time of coating molten resin at least on one surface of a substrate to form a resin film after allowing the substrate and the molten resin to pass through a nip portion between coating rolls, lug portions of the resin film are trimmed before the lug portions are cooled.

In this method, to perform the trimming easily and surely, it is preferable that the resin film is polyester resin and the trimming is performed in the state that a temperature of the lug portions of the resin film is set to not less than (Tg−20° C.).

Further, by setting the relationship between a width (K) of substrate and a width (L) of a resilient body to (K)<(L) and by performing the trimming of the lug portions by a nip pressure due to the resilient force of the coating rolls and edge portions of the substrate, it becomes possible to remove the resin-made lugs continuously and in a stable manner in the very vicinity of the end portions of the substrate without using knives or rotary cutters which may interfere with the substrate.

Further, in view of preventing the above-mentioned interference between the knives or the rotary cutters with the substrate in the above manner, it is desirable to set the relationship between the width (K) of substrate and the width (L) of the resilient body to (K)>(L) and to perform the trimming of the lug portions by a nip pressure due to a resilient force of guide belts and edge portions of the substrate.

In such a method, to surely discharge the lug portions to the outside, it is more preferable to perform the trimming by applying a removing force to the lug portions of the resin film.

Also in such a method, it is desirable to apply a removing force by setting the relationship between a travelling speed V1 of the substrate and a peripheral speed V2 of a guide belt such that they are not made equal. It is because that the trimming can be surely and easily performed.

It is further desirable to set the relationship between the travelling speed V1 of the substrate and a speed V3 of a discharge belt to V1<V3. It is because that a removing force can be applied by using the discharge belt.

In the same manner, to apply a removing force, it is further desirable to set the relationship between the travelling speed V1 of the substrate and a speed V4 of the lug portions of the resin film to V1<V4.

DETAILED DESCRIPTION OF THE PREFERRED EMBODIMENTS

Embodiments of the present invention are explained hereinafter in conjunction with attached drawings.

Figure 1:
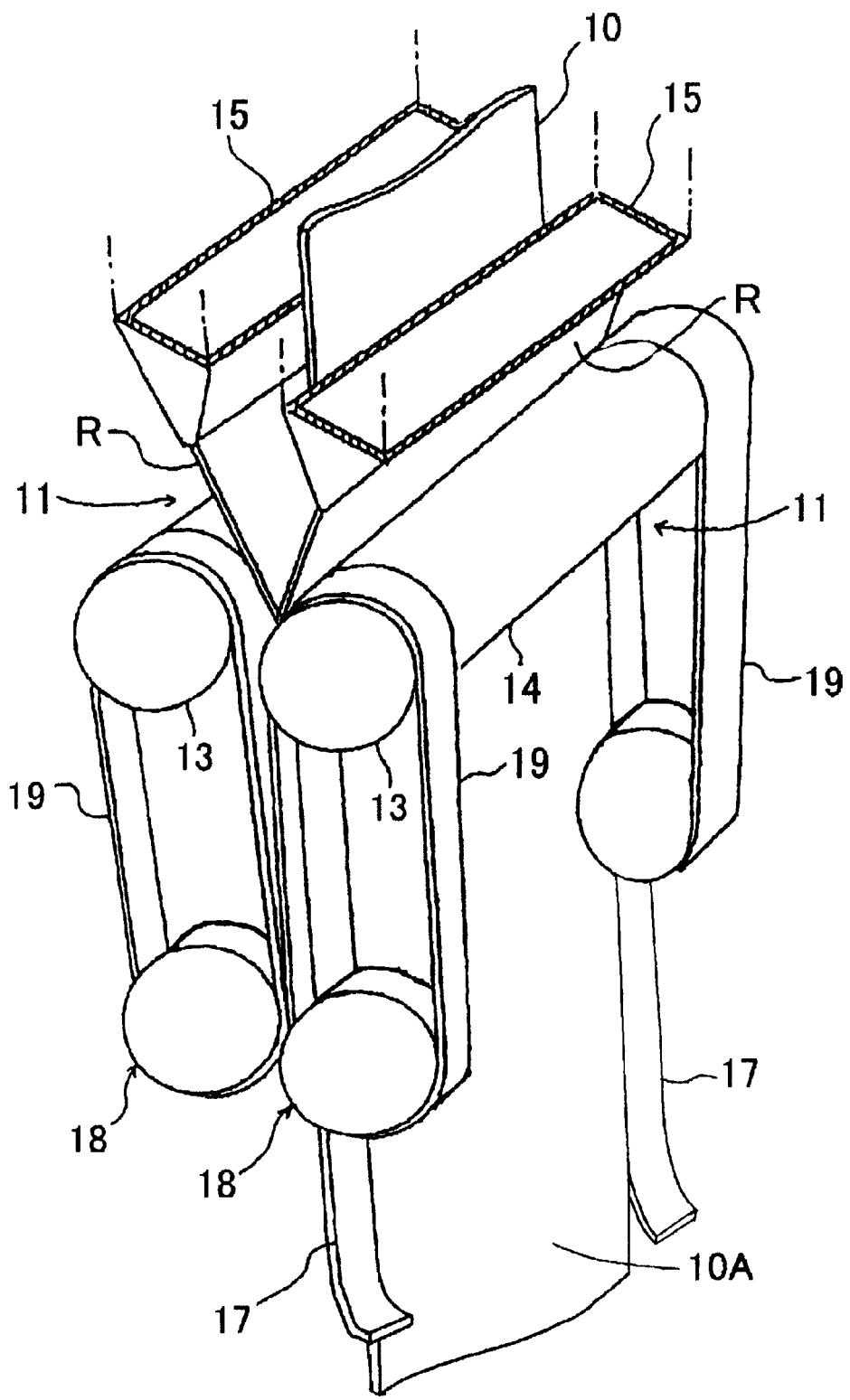
FIG. 1 is a perspective view showing a method for trimming a resin film according to a first embodiment of the present invention.
Figure 2:
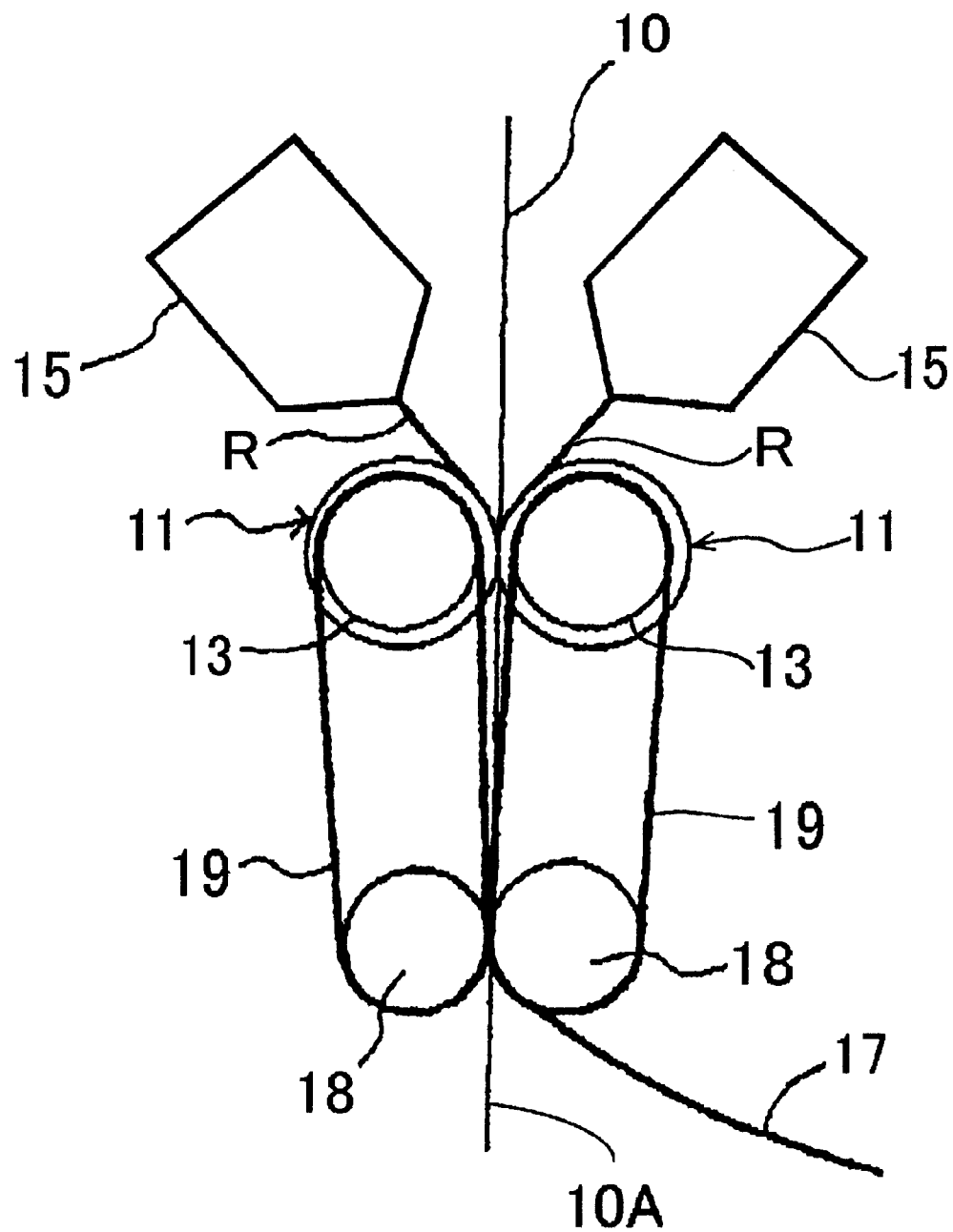
FIG. 2 is a schematic side view showing the method for trimming a resin film according to the first embodiment of the present invention.
Figure 3:
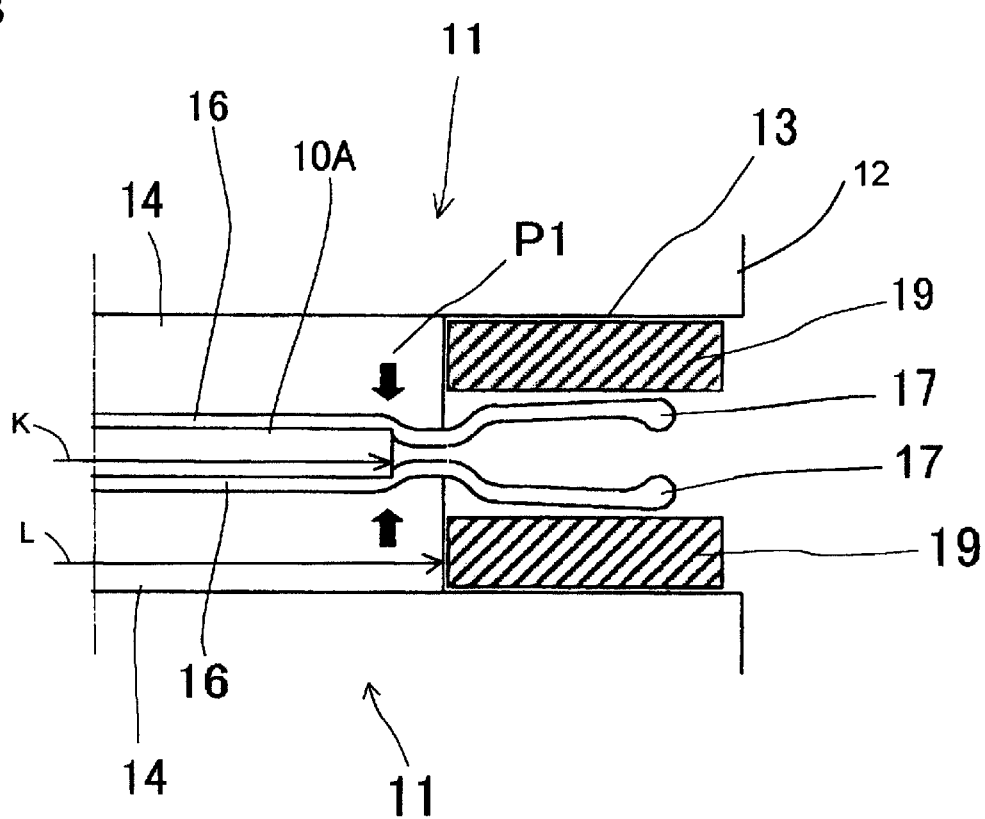
FIG. 3 is a schematic cross-sectional view showing the trimming state of a resin film at a right side from a center line according to the first embodiment of the present invention.
Figure 4:
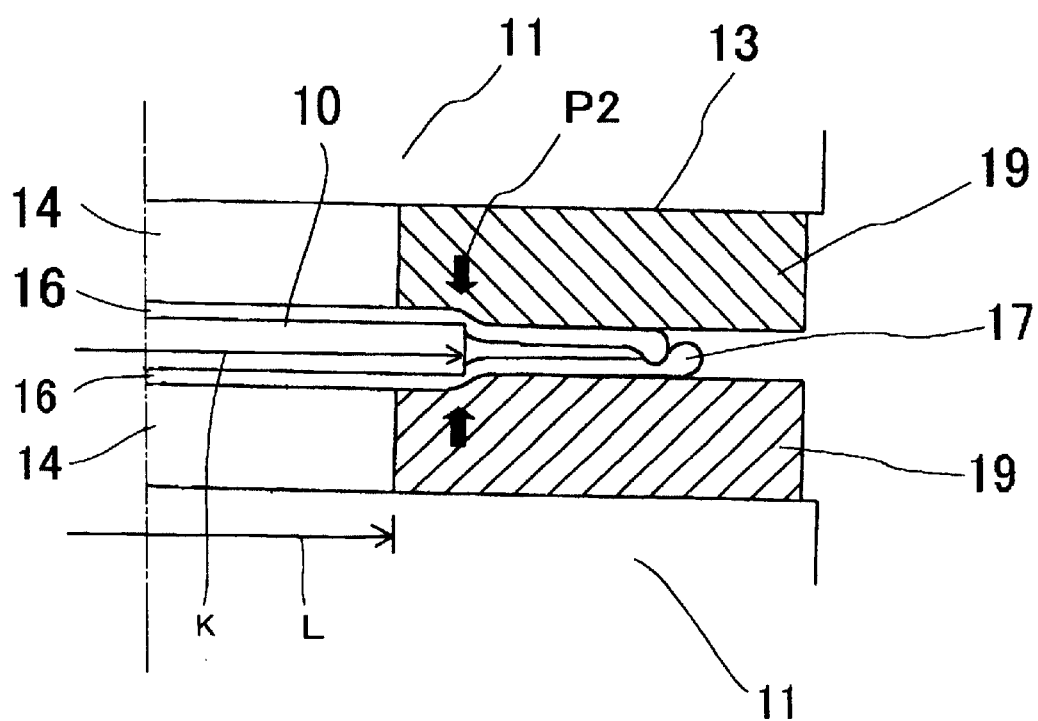
FIG. 4 is a schematic cross-sectional view showing another trimming state of the resin film at the right side from the center line according to the first embodiment of the present invention.
Figure 5:
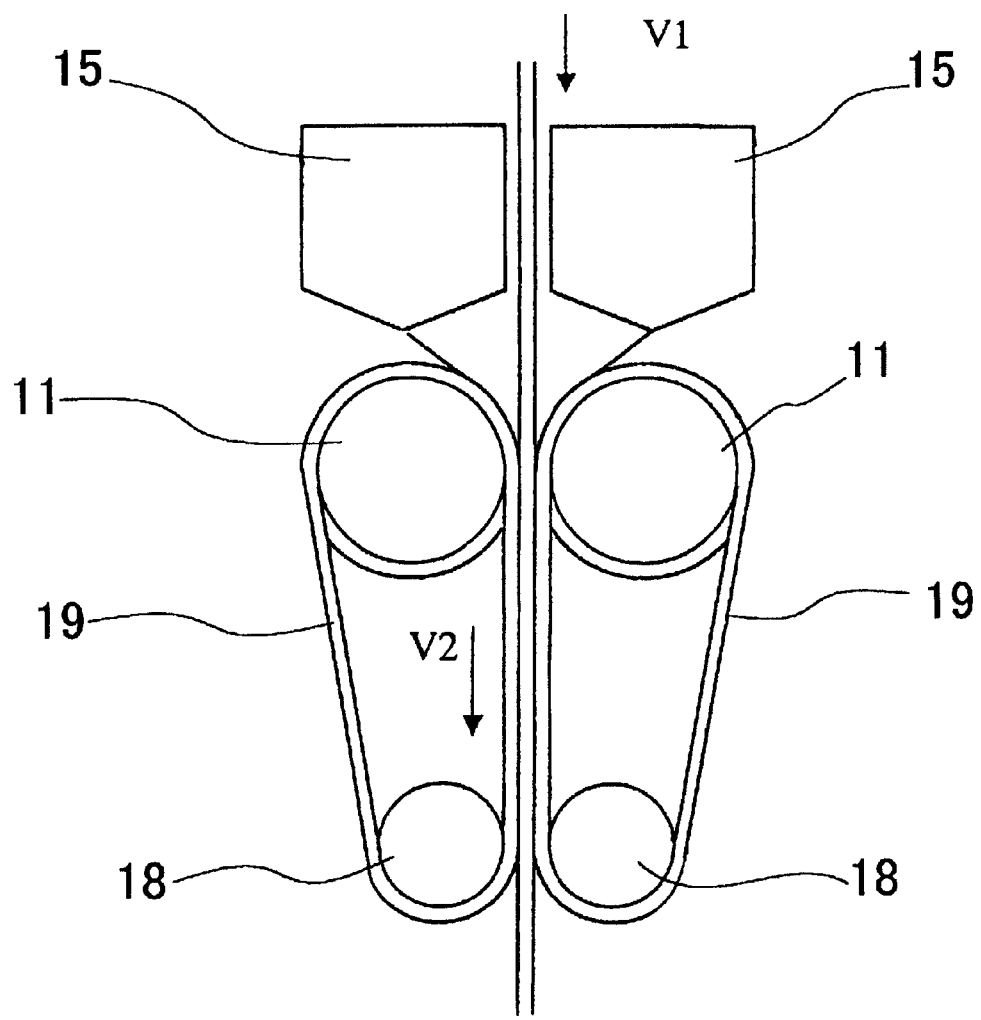
FIG. 5 is a schematic side view showing the trimming of a resin film according to a second embodiment of the present invention.
Figure 6:
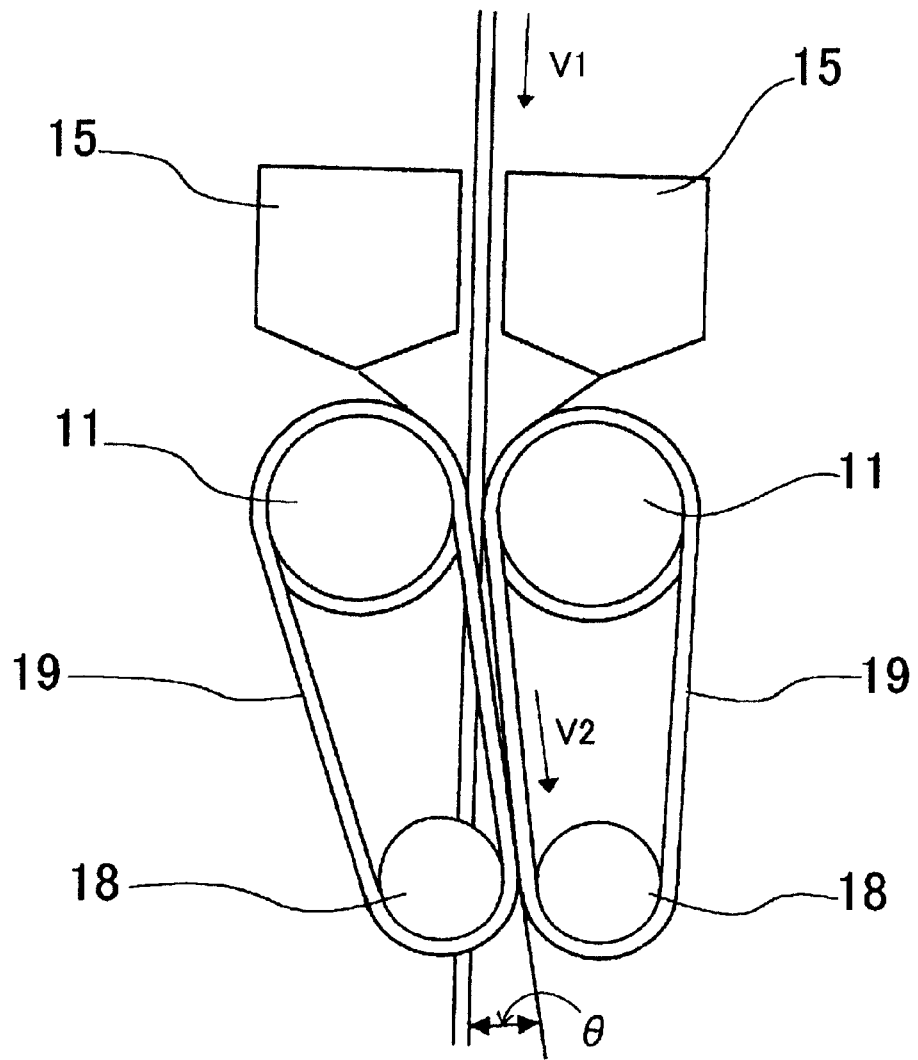
FIG. 6 is another schematic side view showing the trimming of the resin film according to the second embodiment of the present invention.
Figure 7:
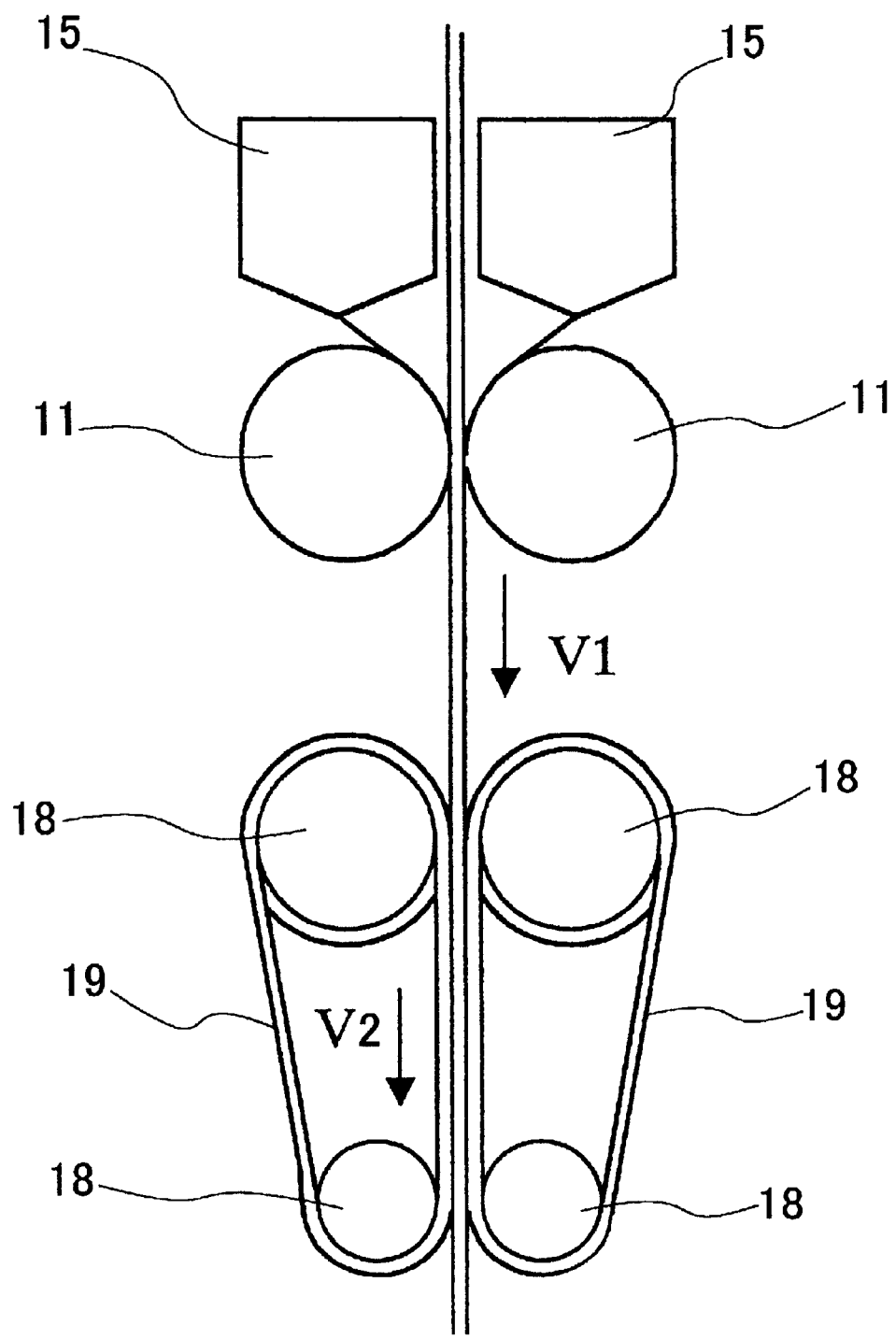
FIG. 7 is a schematic side view showing the trimming of a resin film according to a third embodiment of the present invention.
Figure 8:
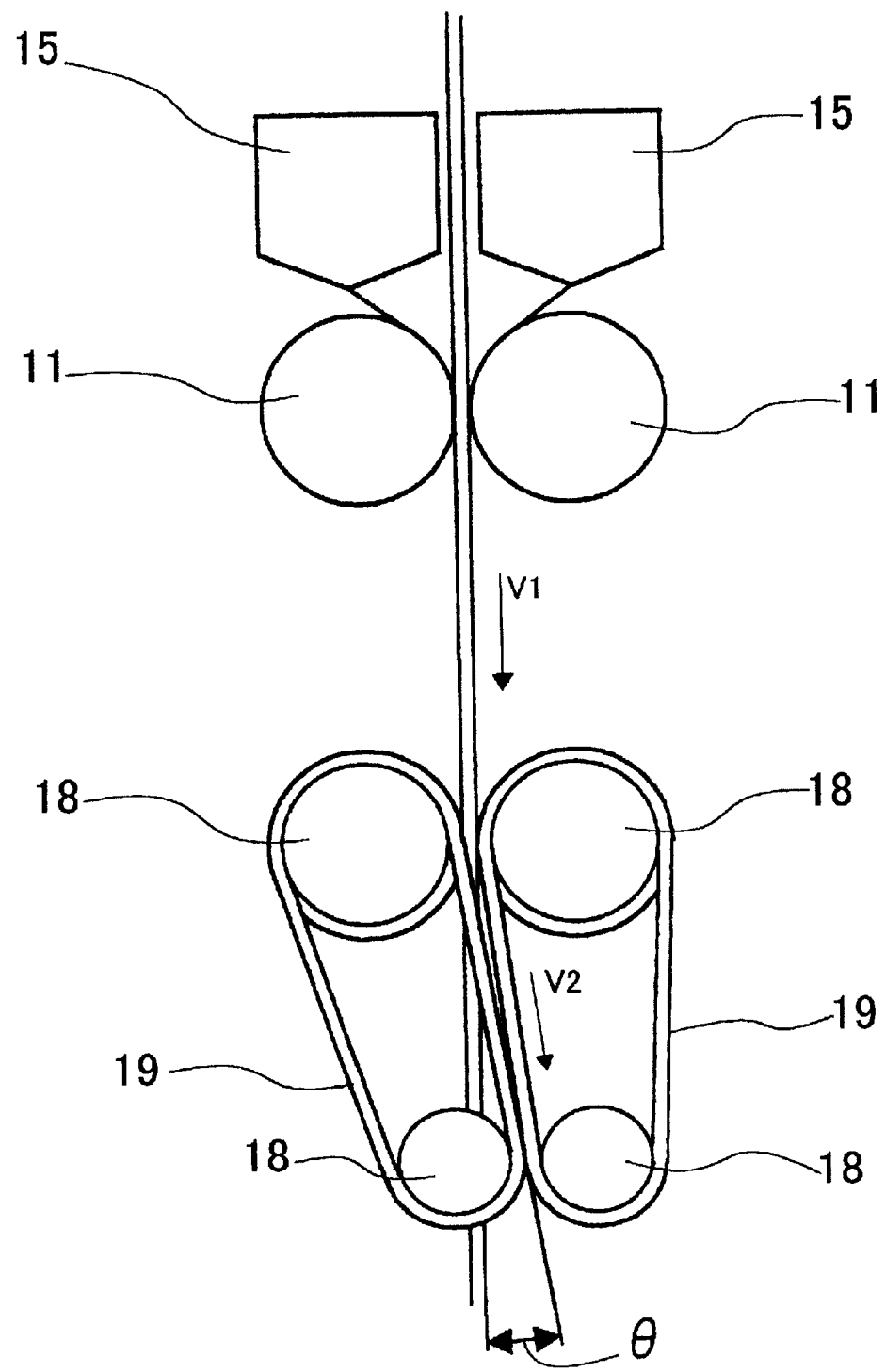
FIG. 8 is another schematic side view showing the trimming of the resin film according to the third embodiment of the present invention.
Figure 9:
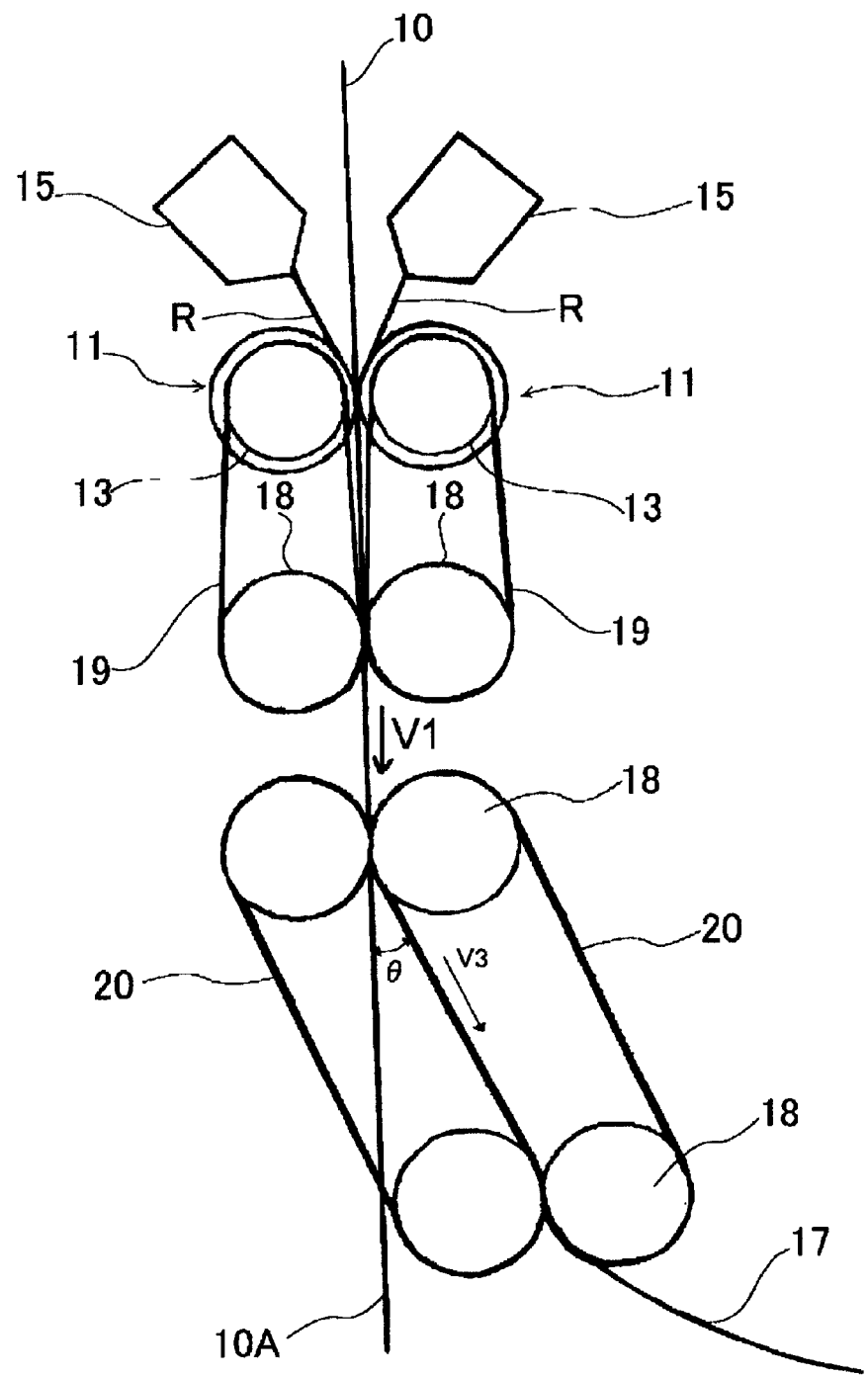
FIG. 9 is a schematic side view showing the trimming of a resin film according to a fourth embodiment of the present invention.
Figure 10:
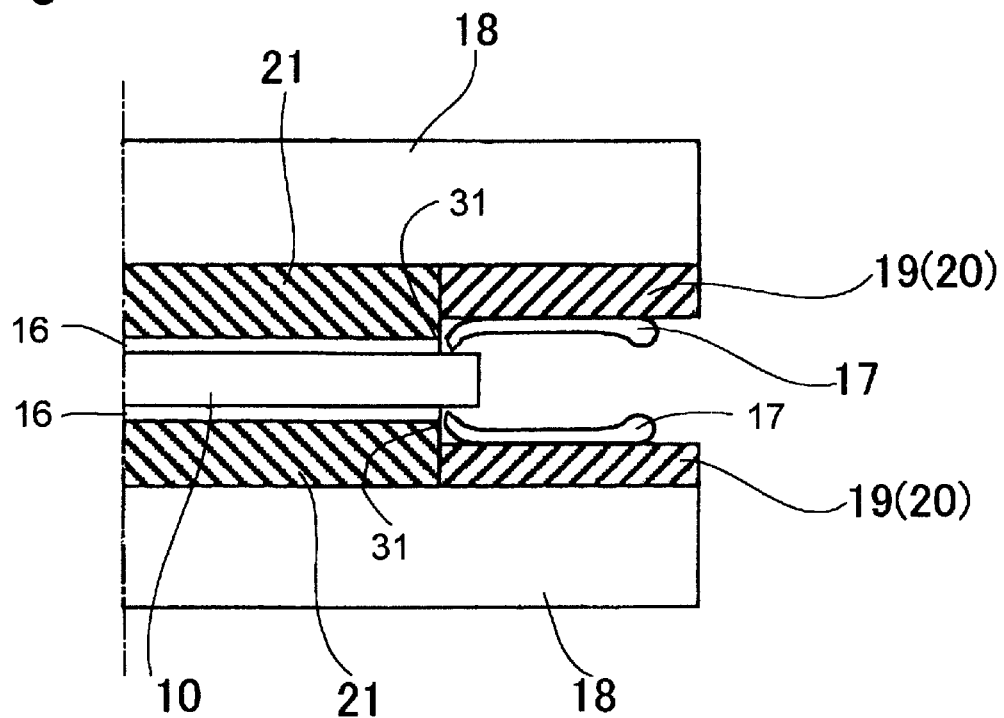
FIG. 10 is a schematic cross-sectional view showing another trimming state of the resin film at a right side from a center line according to third and fourth embodiments of the present invention.
Figure 11:
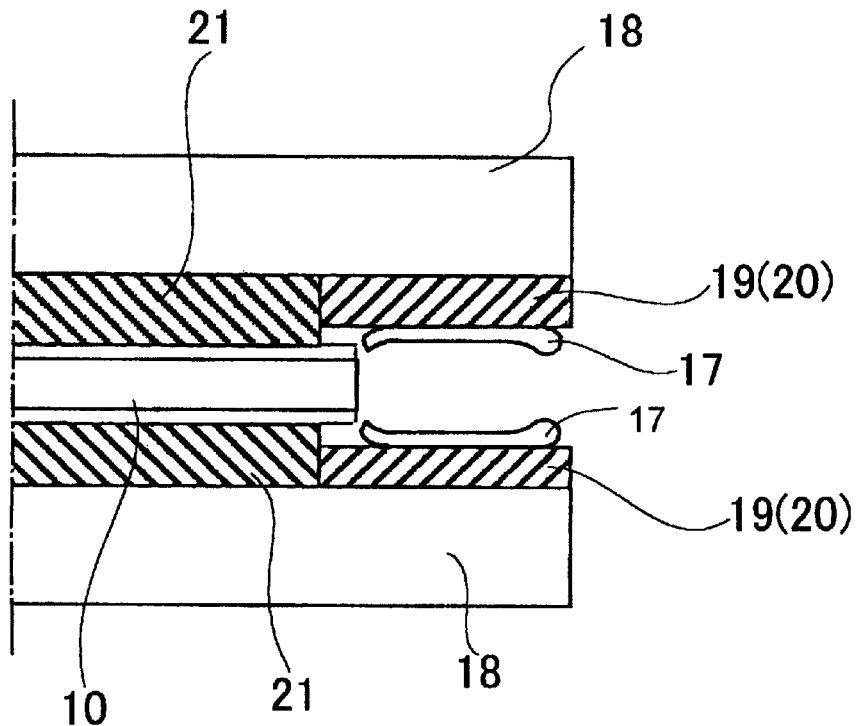
FIG. 11 is a schematic cross-sectional view showing still another trimming state of the resin film at the right side from the center line according to third and fourth embodiments of the present invention.
Figure 12:
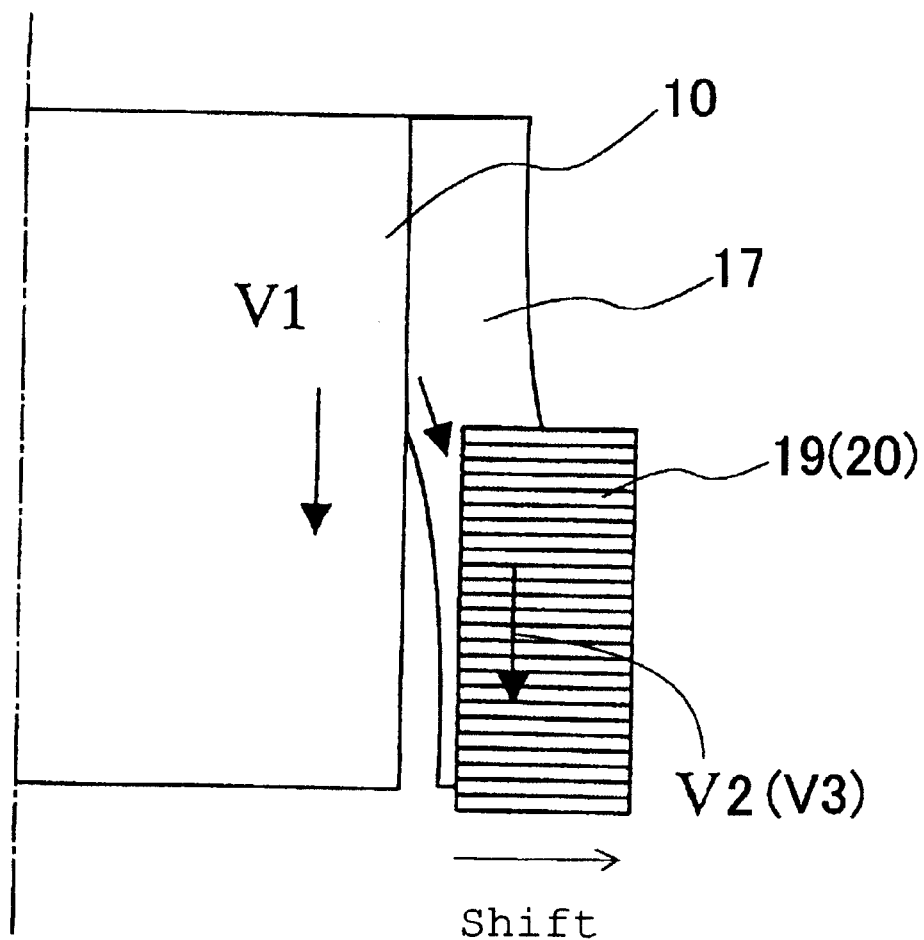
FIG. 12 is a schematic explanatory view showing a further trimming state of the resin film at the right side from the center line according to third and fourth embodiments of the present invention.
Figure 13:
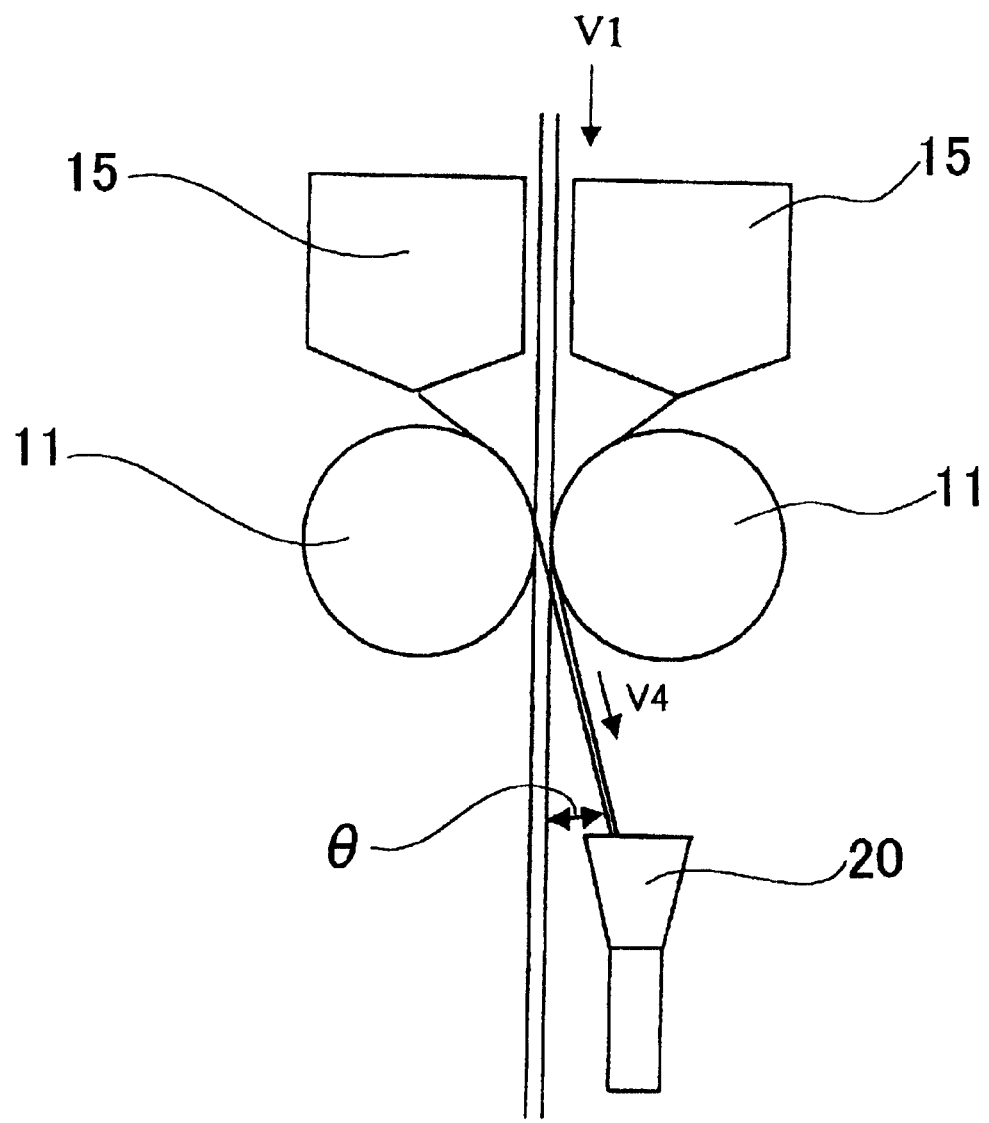
FIG. 13 is a schematic side view showing the trimming of a resin film according to a fifth embodiment of the present invention.
Figure 14:
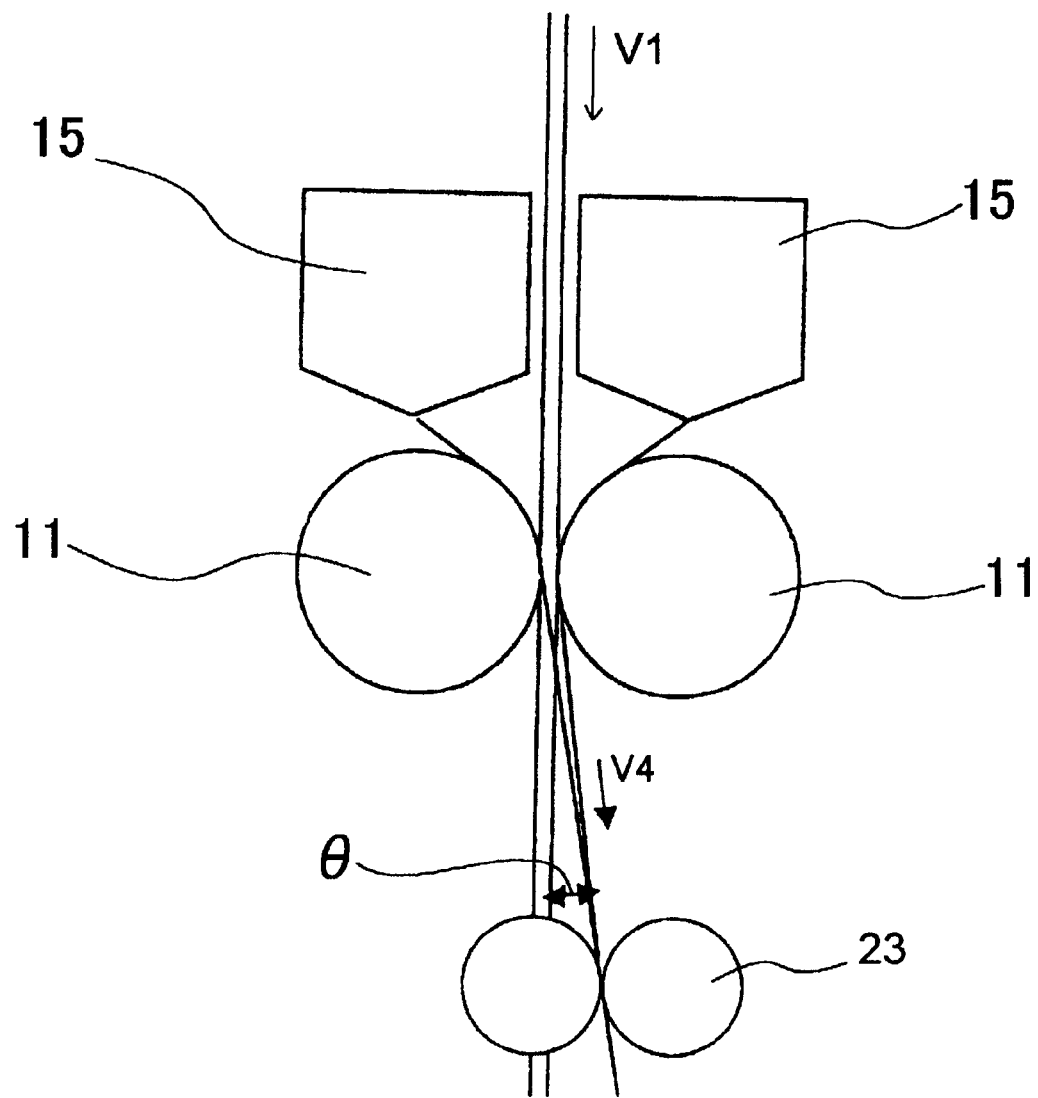
FIG. 14 is a schematic side view showing the trimming of a resin film according to a sixth embodiment of the present invention.
Figure 15:
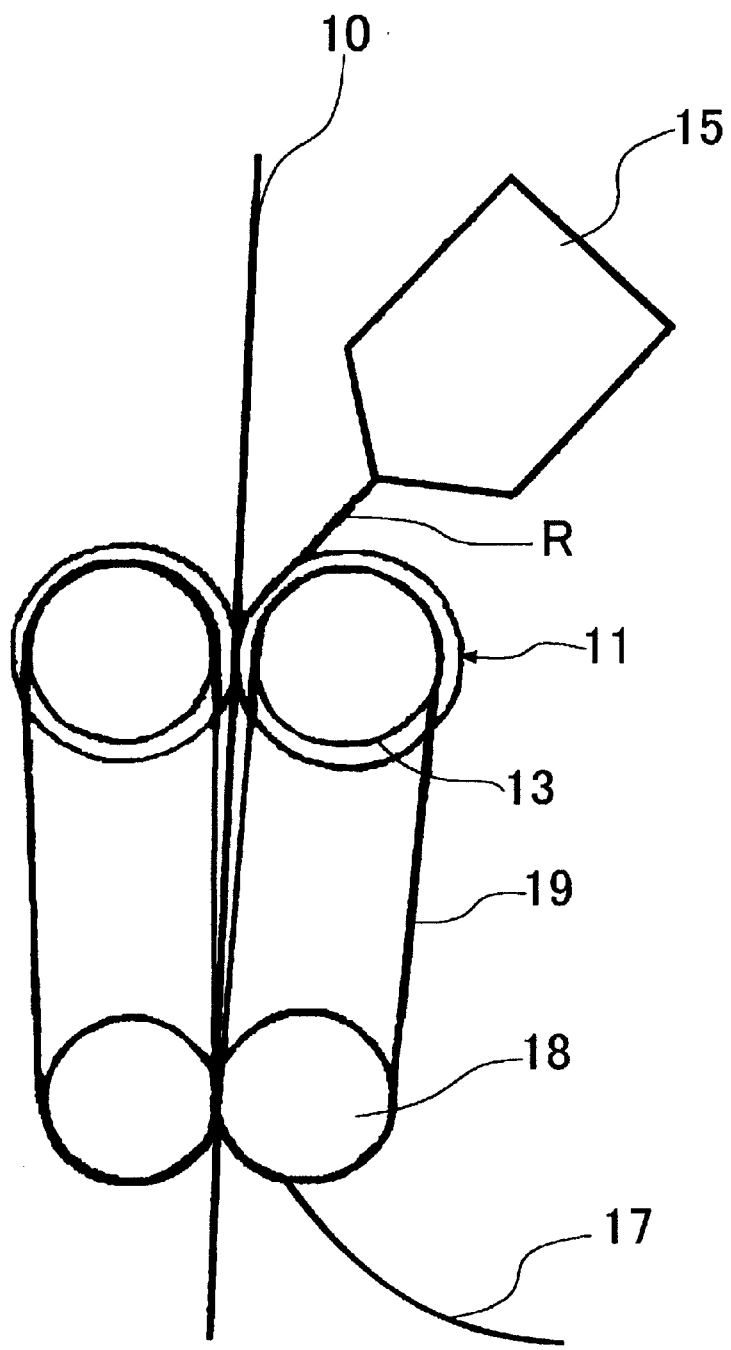
FIG. 15 is a schematic side view showing the trimming of a resin film according to a modification of other embodiment of the present invention.

In the drawings, FIG. 1 is a perspective view showing a method for trimming a resin film according to a first embodiment of the present invention. FIG. 2 is a schematic side view showing the method for trimming a resin film according to the first embodiment of the present invention. FIG. 3 is a schematic cross-sectional view showing the trimming state of a resin film at a right side from a center line according to the first embodiment of the present invention. FIG. 4 is a schematic cross-sectional view showing another trimming state of the resin film at the right side from the center line according to the first embodiment of the present invention. FIG. 5 is a schematic side view showing the trimming of a resin film according to a second embodiment of the present invention. FIG. 6 is another schematic side view showing the trimming of the resin film according to the second embodiment of the present invention. FIG. 7 is a schematic side view showing the trimming of a resin film according to a third embodiment of the present invention. FIG. 8 is another schematic side view showing the trimming of the resin film according to the third embodiment of the present invention. FIG. 9 is a schematic side view showing the trimming of a resin film according to a fourth embodiment of the present invention. FIG. 10 is a schematic cross-sectional view showing another trimming state of the resin film at a right side from a center line according to third and fourth embodiments of the present invention. FIG. 11 is a schematic cross-sectional view showing still another trimming state of the resin film at the right side from the center line according to third and fourth embodiments of the present invention. FIG. 12 is a schematic explanatory view showing a trimming state of the resin film at the right side from the center line according to third and fourth embodiments of the present invention. FIG. 13 is a schematic side view showing the trimming of a resin film according to a fifth embodiment of the present invention. FIG. 14 is a schematic side view showing the trimming of a resin film according to a sixth embodiment of the present invention. FIG. 15 is a schematic side view showing the trimming of a resin film according to a modification of other embodiment of the present invention.

First Embodiment

A first embodiment of the present invention is explained in conjunction with FIG. 1 to FIG. 3.

As shown in FIG. 1 and FIG. 2, while molten resin R is extruded from T-dies 15 toward both surfaces of a travelling metal sheet 10, the metal sheet 10 is made to pass through a nip portion between a pair of coating rollers 11 so that resin films 16 are laminated to both surfaces of the metal sheet 10.

Then, lug portions 17 which are formed on both side peripheries of the resin film 16 are trimmed within a period that the lug portions 17 are not cooled, and the trimmed lug portions 17 are discharged to the outside by sandwiching the lug portions 17 with the use of rotatably driven guide belts 19. Here, although the temperature of the resin film "within a period" differs depending on the kind of resin film, it is sufficient for the temperature to be a temperature which prevents the solidifying of the resin film.

Here, to perform the trimming easily and surely, it is preferable to perform the trimming in the state that the temperature of the lug portions 17 to be trimmed, to be more specific, the temperature of portions to be cut of the lugs in the vicinity of the end portions of the substrate is set to not less than (Tg −20° C.) when the resin film is made of polyester resin, for example. On the other hand, it is not preferable to perform the trimming operation when the temperature of the lug portions 17 to be trimmed is less than the above-mentioned temperature. This is because that, in such a temperature range, it is difficult to perform the trimming by making use of the nipping force or the removing force and the lugs tend to be cut in the subsequent take-up operation of the lugs.

According to this embodiment, as shown in FIG. 1 and FIG. 2, on both surface sides of the metal sheet 10 which constitutes one example of the substrate and travels in the vertical direction, a pair of elongated coating rolls 11 are arranged such that the metal sheet 10 is sandwiched by these coating rolls 11.

As shown in FIG. 2 and FIG. 3, each coating roll 11 is configured such that a cylindrical resilient body 14 is mounted on a surface of an elongated roll body 12 except for belt mounting portions 13 which are formed at both end portions of the coating roll 11.

Then, the metal sheet 10 is pinched or sandwiched in the state that the metal sheet 10 is brought into pressure contact with a pair of coating rolls 11 by way-of the resilient body 14.

On the other hand, as shown in FIG. 1 and FIG. 2, above (or at the upstream of) a pair of coating rolls 11, a pair of T-dies 15 which are respectively capable of extruding molten resin R are arranged.

Then, the molten resins R are respectively extruded from the T-dies 15 to nip portions which are formed between the respective coating rolls 11 and the surfaces of the metal sheet 10 corresponding to the coating rolls 11. Thereafter, by adhering the molten resins R to the metal sheet 10 under pressure using a pair of the coating rollers 11, the resin films 16 are formed on both surfaces of the metal sheet 10 thus manufacturing a laminated sheet 10A.

In this operation, by setting the width of the T-dies 15 such that the film width of the molten resins R from the T-dies 15 becomes wider than the width of the metal sheet 10, lug portions 17 of the resin films 16 are, as shown in FIG. 3, positioned within guide belts 19 mounted on the belt mounting portions 13 which are formed at both ends of respective resilient bodies 14.

Further, as shown in FIG. 1 and FIG. 2, a pair of belt mounting rolls 18 are arranged at given positions at both sides of the metal sheet 10 which constitutes one example of the substrate and travels in the vertical direction and below (at the downstream of) a pair of elongated coating rollers 11 such that the belt mounting rollers 18 are not brought into contact with both surfaces of the metal sheet 10. These belt mounting rolls 18 discharge the lug portions 17 of the trimmed resin film 16 while preventing the winding of the lug portions 17 around the coating rolls 11.

Although not shown in the drawing, a pair of these belt mounting rolls 18 extending in the substrate width direction maybe formed in an elongated roll configuration like the coating rolls 11.

Further, as shown in FIG. 1 and FIG. 3, a pair of guide belts 19 are respectively mounted on the belt mounting portions 13 formed at both end portions of the coating rolls 11 and the belt mounting rolls 18 such that the guide belts 19 form stepped portions by retracting from the surface of the resilient body 14 of the coating roll 11.

The guide belts 19 are respectively arranged in parallel along both side peripheries of the metal sheet 10 and have upper and lower end portions thereof respectively wound around the belt mounting portions 13 formed at both end portions of the coating rolls 11 and the belt mounting rolls 18.

In this embodiment, FIG. 3 shows the trimming state in which the relationship between the width of the metal sheet 10 (that is, the width K of the substrate) and the width L of the resilient body 14 on the coating roll 11 is set to the width K of the substrate<the width L of the resilient body 14 (the resilient body width L). In such a trimming state, the lug portion 17 of the resin film 16 is trimmed by shearing due to an edge portion of the metal sheet 10 and a nip pressure P1 of the resilient body 14 of the coating roll 11.

Further, in this embodiment, as shown in FIG. 4, the relationship between the width of the metal sheet 10 (that is, the width K of the substrate) and the width L of the resilient body 14 on the coating roll 11 can be set to the width K of the substrate>the width L of the resilient body 14 (the resilient body width L). In this case, the lug portion 17 of the resin film 16 may be trimmed by shearing due to an edge portion of the metal sheet 10 and a nip pressure P2 of the guide belt 19.

In this manner, even when the trimming is performed making use of the edges of metal sheet 10, the resin lug portions 17 can be removed continuously and in a stable manner in the very vicinity of the end portions of the substrate 10.

Further, by performing the trimming in the above-mentioned manner, the resin lug portions 17 can be removed continuously and in a stable manner in the very vicinity of the end portions of the substrate without using knives or rotary cutters which have the possibility of interfering with the substrate.

Second Embodiment

FIG. 5 shows the second embodiment of the present invention. In this embodiment, at the time of performing the trimming of the lug portions 17 of the resin film 16, by setting the relationship between the travelling speed V1 of the substrate 10 and the peripheral speed V2 of the guide belt 19 such that these speeds are not equal, at the time of performing the trimming, a removing force which peels off the film from the metal sheet is given to the lug portions 17 of the resin film 16 whereby the trimming is performed.

In this embodiment, as shown in FIG. 6, a pair of guide belts 19 can be inclined by a given angle θ (inclination angle) with respect to the travelling direction of the metal sheet 10 and the trimmed lug portions 17 of the resin film 16 can be discharged to the outside in the state that the trimmed lug portions 17 of the resin film 16 is sandwiched between the inclined guide belts 19.

As mentioned above, by inclining the guide belts 19, it becomes possible to start the discharge of the lug portions 17 of the resin film 16 simultaneously with the trimming and the trimmed lug portions 17 are guided in the direction away from the travelling direction of the metal sheet 10. Accordingly, there is no possibility that the lug portions 17 which are once cut and separated are adhered to the laminated plate 10A again or are wound around the coating rolls 11 whereby the lug portions 17 can be smoothly and surely discharged to the outside.

Third Embodiment

FIG. 7 shows the third embodiment of the present invention. This embodiment is characterized in that guide belts 19 are arranged below (at the downstream of) coating rolls 11. Due to such a constitution, resin films 16 are laminated to a substrate 10 by means of coating rolls 11 and, thereafter, the lug portions 17 of the resin film 16 are trimmed by the guide belts 19.

Further, by setting the relationship between the travelling speed V1 of the substrate 10 and the peripheral speed V2 of the guide belts 19 such that these speeds are not equal, a removing force which peels off the film from the metal sheet 10 is given to the lug portions 17 of the resin film 16 whereby the trimming is performed.

In this embodiment, as shown in FIG. 8, a pair of guide belts 19 which are arranged below the coating rolls 11 can be inclined by a given angle θ with respect to the travelling direction of the metal sheet 10 and the lug portions 17 of the trimmed resin film 16 can be discharged to the outside in the state that the trimmed lug portions 17 of the resin film 16 are sandwiched between the inclined guide belts 19.

Fourth Embodiment

FIG. 9 shows the fourth embodiment of the present invention. In this embodiment, below coating rolls 11 and guide belts 19, a pair of discharge belts 20 are arranged such that they are inclined by a given angle θ with respect to the travelling direction of a metal sheet 10. Further, the relationship between the travelling speed V1 of the metal sheet 10 and the peripheral speed V3 of the discharge belts 20 is set to V1<V3.

As a result, in this embodiment, the resin films 16 are laminated to the substrate 10 using the coating rolls 11. Then, the lug portions 17 of the resin film 16 are guided by the guide belts 19 and, thereafter, the lug portions 17 are trimmed using the removing force of the discharge belts 20.

Here, although the discharge belts 20 may not be inclined by a given angle θ, it is preferable to incline the discharge belts 20 by a given angle θ to prevent the winding of the trimmed lug portions 17 around the guide rolls and to smoothly and surely discharge the lug portions 17 to the outside.

FIG. 10 to FIG. 12 are reference views which show the trimming states when the trimming is performed by giving the removing force used in the third and fourth embodiments to the lug portions 17. The state shown in FIG. 10 is a state in which the trimming is performed by pressing portions of the resin film 16 in the vicinity of the lug portions 17 of the resin film 16 with roll edges of a guide roll 18, that is, end peripheries 31 of a resilient body 21 of the guide roll 18. On the other hand, the state shown in FIG. 11 is a state in which the lug portions 17 are trimmed with edges of the substrate 10. In both cases, the lug portions 17 are trimmed by the removing force given to the lug portions 17.

In this case, as shown in FIG. 12, to perform easily, surely and smoothly the trimming of the lug portions 17 of the resin film 16 by giving the removing force to the lug portions 17, it is preferable to arrange a pair of guide belts 19 of the third embodiment shown in FIG. 7 and FIG. 8 such that the guide belts 19 are shifted away from the metal sheet 10 in the widthwise direction of the metal sheet 10. To enable such an easy, assured and smooth trimming, it is also preferable to arrange a pair of discharge belts 20 of the fourth embodiment shown in FIG. 9 such that the discharge belts 20 are shifted away from the metal sheet 10 in the widthwise direction of the metal sheet 10. Further, a method which arranges the guide belts 19 or the discharge belts 20 close to the metal sheet 10 initially and then gradually shifts the guide belts 19 or the discharge belts 20 away from the metal sheet 10 is also applicable to this embodiment.

Fifth Embodiment

FIG. 13 shows the fifth embodiment of the present invention. In this embodiment, lug portions 17 of a resin film 16 are sucked by a blower (a vacuum duct) 22 which is arranged below coating rolls 11 and the suction and the discharge of the lug portions 17 are performed in the state that the lug portions 17 are inclined by a given angle θ with respect to the travelling direction of a metal sheet 10.

Here, by setting the relationship between the travelling speed V1 of the metal sheet 10 and the speed V4 of the lug portions 17 of the resin film 16 to be trimmed to V1<V4 due to the adjustment of the travelling speed V1 of the substrate or the suction of the blower 22, the removing force is given to the lug portions 17 so that the lug portions 17 can be trimmed.

Sixth Embodiment

FIG. 14 shows the sixth embodiment of the present invention. In this embodiment, as in the case of the above-mentioned embodiment 5, lug portions 17 of a resin film 16 are sandwiched between guide rolls (nip rolls) 23 which are arranged below coating rolls and, thereafter, the lug portions 17 are pulled and discharged in the state that the lug portions 17 are inclined by a given angle θ with respect to the travelling direction of the metal sheet 10.

Here, the relationship between the travelling speed V1 of the substrate 10 and the speed V4 of the lug portions 17 of the resin film 16 to be trimmed is set to V1<V4 as in the case of the fifth embodiment by adjusting the travelling speed V1 of the substrate and the peripheral speed of the guide roll 23.

Here, with the above-mentioned second to sixth embodiments, the embodiment can be used in combination with the first embodiment.

That is, the trimming of the lug portions 17 of the resin film 16 can be performed by using the removing forces respectively derived from the edge portions of the metal sheet 10, the nip pressure P1 of the resilient body 14 of the coating roll 11, the nip pressure P2 of the guide belt 19, the setting of the speed V1 of the substrate 10 and the peripheral speed V2 of the guide belt 19 unequal, the peripheral speed V3 of the discharge belt 20, the speed V4 of the resin film 16 and the like.

As has been described heretofore, although the method and the apparatus for trimming the resin film according to the present invention have been explained in conjunction with the first to sixth embodiments, the present invention is not limited to these embodiments and includes other embodiments and modifications.

For example, in the above-mentioned first and fourth embodiments, the blower, the vacuum duct, the guide rolls, the nip rolls and the like which are described in the fifth and sixth embodiments may be arranged below (at the downstream of) the guide belts or the discharge belts so as to recover the lug portions of the resin film after trimming.

Further, as shown in FIG. 15, it is needless to say that the present invention is also applicable to a trimming of lug portions in which the T-die 15 is provided such that the resin is laminated to only one surface of a metal sheet 10 which constitutes a substrate thus forming a resin film on one surface of the metal sheet.

Materials which are used in the present invention are explained hereinafter.

Substrate

It is preferable to use the metal material as the substrate to be used in the present invention and, as such metal material, it is preferable to use various kinds of surface treated steel sheets, light metal sheets, metal foils or the like.

As the surface treated steel sheet, a cold rolled steel sheet to which one kind, two or more kinds of surface treatments such as galvanizing (zinc plating), tin plating, nickel plating, electrolytic chromic acid treatment, chromic acid treatment are applied can be used. One preferred example of the surface treated steel sheet is the electrolytic chromatic acid processed steel sheet and particularly is such a steel sheet having 10 to 200 mg/m$^2$ of a metal chromium layer and 1 to 50 mg/m$^2$ (metal chromium conversion) of a chromium hydrated oxide layer. This electrolytic chromic acid treated steel sheet exhibits the excellent combination of the coating resin adhesion and the excellent corrosion resistance. As another example of the surface processed steel sheet, a tin sheet having a tin plating quantity of 0.6 to 11.2 g/m$^2$ is named. It is preferable that chromic acid treatment or chromic acid/phosphating treatment is applied to the surface of the tin sheet such that the chromium quantity amounts to 1 to 30 mg/m$^2$ by metal chromium conversion. Further, an aluminum coated steel sheet to which aluminum plating or aluminum pressure welding is applied can be also used.

As the metal sheet, besides a pure aluminum sheet, a light metal sheet such as an aluminum alloy sheet can be also used. The aluminum alloy sheet which exhibits the excellent corrosion resistance and the excellent formability has the composition consisting of Mn: 0.2 to 1.5 weight%, Mg: 0.8 to 5 weight %, Zn: 0.25 to 0.3 weight %, Cu: 0.16 to 0.26 weight % and Al as the balance. It is also preferable that chromic acid treatment or chromic acid/phosphate treatment is applied to the surface of these light metal sheets such that the chromium quantity amounts to 20 to 30 mg/m$^2$ by metal chromium conversion.

It is preferable that the metal sheet has the thickness of 0.10 to 0.50 mm. It is more preferable that the metal sheet has the thickness of 0.10 to 0.30 mm when the metal sheet is the surface processed sheet and the metal sheet has the thickness of 0.15 to 0.40 mm when the metal sheet is the light metal sheet. It is needless to say that it is necessary to take into consideration the fact that the thickness of the metal sheet differs depending on the kinds of metals or the usage or sizes of the laminated materials.

An adhesive primer layer may be formed on the metal material.

It is necessary for the primer to exhibit the excellent adhesiveness to both of the metal material and the thermoplastic resin. As an example of the primer coating, a phenolepoxy-based coating formed of resol type phenol aldehyde induced from various phenols and formaldehyde and bisphenol type epoxy resin can be used. Particularly, the coating which contains phenol resin and epoxy resin at a weight ratio of 50:50 to 5:95, particularly at a weight ratio of 40:60 to 10:90 is preferably applicable. It is preferable that the adhesive primer layer has a thickness of approximately 0.3 to 5 μm from a viewpoint of the adhesion or the like.

Resin

It is preferable to use thermoplastic resin as the resin which coats the substrate. As the thermoplastic resin, any resin which is extrudable and has the film forming ability can be used. For example, any one of polyolefin formed of random of some α-olefin or block copolymer such as low-density polyethylene, high-density polyethylene, polypropylene, poly1-butene, poly4-methyl-1-pentene or ethylene, propylene, 1-butene, 4-methyl-1-pentyne, ethylene vinyl compound copolymer such as ethylene vinyl acetate copolymer, ethylene vinyl alcohol copolymer, ethylene vinyl chloride copolymer, styrene-based resin such as polystyrene, acrylic nitrile styrene copolymer, ABS (Acrylonitrile-butadiene-styrene), α-methylstyrene styrene copolymer, polyvinyl chemical compound such as polyvinyl chloride, polyvinylidene chloride, vinyl chloride vinylidene copolymer, polymethyl acrylate, polymethyl methacrylate, polyamide such as nylon 6, nylon 6–6, nylon 6–10, nylon 11, nylon 12, thermoplastic polyester such as polyethylene terephthalate, polybutylene terephthalate, polycarbonate, polyphenylene oxide or a mixture of these compounds can be used as the thermoplastic resin.

As the particularly preferable thermoplastic resin from a viewpoint of the film physical properties, formability, the corrosion resistance and the like, the thermoplastic polyester, the copolymer polyester, or a mixture of these resins, and a laminated body made of these resins are named. Among these resins, the polyester which is mainly formed of ethylene terephthalate unit is preferably used.

Although the polyethylene terephthalate can be used as the raw material polyester, it is also preferable to introduce the copolymer ester units other than ethylene terephthalate in the polyester since the lowering of the maximum crystallization temperature is desirable from a viewpoint of the shock resistance and the formability of the laminated material.

It is particularly preferable to use the copolymer polyester which contains the ethylene terephthalate units as the major component and a small amount of other ester units and has a melting point of 210 to 252° C. Here, the melting point of the homopolyethylene terephthalate is generally 255 to 265° C.

In general, in the copolymer polyester, it is preferable that not less than 70 mol % and particularly not less than 75 mol % of a dibasic acid component is constituted of a terephthalic acid component, not less than 70 mol % and particularly not less than 75 mol % of a diol component is constituted of ethylene glycol, and 1 to 30 mol % and particularly 5 to 25 mol % of a dibasic component and/or diol component is constituted of a dibasic acid component other than terephthalic acid and/or a diol component other than ethylene glycol.

As the dibasic acid other than the terephthalic acid, one kind or a combination of two or more kinds of aromatic dicarboxylic acid such as isophthalic acid, phthalic acid or naphthalene dicarboxylic acid, alicyclic dicarboxylic acid such as cyclohexane dicarboxylic acid, and aliphatic dicarboxylic acid such as succinic acid, adipic acid or sebacic acid or dodecanedioic acid can be named. As the diol component other than ethylene glycol, one kind or a combination of two or more kinds of propylene glycol, 1,4-butanediol, diethylene glycol, 1,6 hexylene glycol, cyclohexane dimethanol, and an ethylene oxide adduct of bisphenol A are named.

With respect to the combination of these comonomers, it is necessary to set the melting point of the copolymer polyester with the above-mentioned range. Further, it is also possible to use a polyfunctional comonomer such as trimellitic acid, pyromellitic acid or pentaerythritol in combination with the above-mentioned combination of copolymer.

To enable the used polyester to have the molecular weight sufficient to form the film, it is preferable to set the intrinsic viscosity (I.V.) of the polyester resin within a range of 0.55 to 1.9 dl/g, and particularly within a range of 0.65 to 1.4 dl/g.

To conceal the metal substrate or to facilitate the transmission of a wrinkle suppression force to the metal sheet at the time of drawing and redrawing for forming, the coating layer made of the thermoplastic resin may contain an inorganic filler (pigment). Further, a film blending agent which is publicly known per se, that is, an anti-blocking agent such as amorphous silica, various kinds of electrification prevention agents, a lubricant, an oxidation prevention agent, an ultraviolet-ray absorption agent and the like may be blended into the coating resin film in publicly known manner.

As the inorganic filler, an inorganic pigment such as rutile type or anatase type titanium oxide, rice flour or gloss white, a white extender such as barytes, precipitated sulfuric acid barytes, calcium carbonate, gypsum, settlable silica, aerogel, talc, baked or unbaked clay, barium carbonate, alumina white, synthetic or natural mica, synthetic calcium silicate or magnesium carbonate, a black pigment such as carbon black or magnetite, a red pigment such as red iron oxide, a yellow pigment such as shellac varnish, and a blue pigment such as ultramarine blue or cobalt blue can be named. It is preferable that the inorganic filler is blended into the thermoplastic resin at a rate of 10 to 500 weight % per 100 weight % of resin and more particularly at a rate of 10 to 300 weight % per 100 weight % of resin.

As has been described heretofore, according to the present invention, in performing the trimming of the lug portions of the lug portions of the resin film, the lug portions can be trimmed easily, surely and smoothly.

Further, the resin film after trimming can be recycled. Further, even when the resin film is formed of resin-based material which becomes fragile by cooling, the resin film can be easily trimmed. Still further, it becomes possible to enhance the use efficiency of the laminated sheet by making the resin film portion on both sides of the laminated sheet thin.

What is claimed is:

1. A method for trimming a resin film wherein, at the time of coating molten resin on at least one surface of a substrate to form a resin film after allowing the substrate and the molten resin to pass through a nip portion between resilient coating rolls, the nip pressure resulting from the resilient force of the coating rolls at edge portions of the substrate creates a removing force which removes lug portions of the film from the edge of the substrate.

2. The method for trimming a resin film according to claim 1, wherein the resin film is polyester resin and the trimming is performed in the state that a temperature of the lug portions of the resin film is set to not less than a glass transition temperature −20° C.

3. The method for trimming a resin film according to claim 1 or claim 2, wherein the relationship between a width (K) of substrate and a width (L) of a resilient body on the coating rolls is set to (K)<(L) and the trimming of the lug portions is performed by a nip pressure due to the resilient force of the coating rolls and edge portions of the substrate.

4. The method for trimming a resin film according to claim 1 or claim 2, wherein the relationship between the width (K) of substrate and the width (L) of a resilient body on the coating rolls is set to (K)>(L) and the trimming of the lug portions is performed by a nip pressure due to the resilient force of guide belts and edge portions of the substrate.

5. The method for trimming a resin film according to claim 1 or claim 2, wherein a removing force is given by setting the relationship between a travelling speed V1 of the substrate and a peripheral speed V2 of a guide belt such that they are not equal.

6. The method for trimming a resin film according to claim 1 or claim 2, wherein a removing force is given by setting the relationship between a travelling speed V1 of the substrate and a speed V3 of a discharge belt to V1<V3 by way of a discharge belt.

7. The method for trimming a resin film according to claim 1 or claim 2, wherein a removing force is given by setting the relationship between a travelling speed V1 of the substrate and a speed V4 of the lug portions of the resin film to V1<V4.

* * * * *